Patented Feb. 5, 1952

2,584,306

UNITED STATES PATENT OFFICE 2,584,306

POLYMERIZATION OF ETHYLENICALLY UNSATURATED COMPOUNDS

Clement W. Theobald, Wilmington, Del., assignor to E. I. du Pont de Nemours & Company, Wilmington, Del., a corporation of Delaware No Drawing. Application February 1, 1950, Serial No. 141,843

10 Claims. (Cl. 260—88.7)

This invention relates to the addition polymerization of polymerizable organic compounds and more particularly to new polymerization catalyst systems.

Polymerization of ethylenically unsaturated compounds is a process of great technical importance. Generally employed as polymerization catalysts are compounds containing directly linked oxygen atoms such as benzoyl peroxide or potassium persulfate. In conventional polymerization systems, relatively high temperatures are required to obtain high rates of conversion of the monomeric unsaturate to a polymer. The use of elevated temperatures often leads to products of inferior qualities. In some instances where appreciable rates of polymerization have been achieved at lower temperatures, the products obtained have superior physical properties which are of substantial economic importance, such as, for example, the increased abrasion resistance of synthetic rubbers prepared at low temperatures. Accordingly, new and improved systems of low temperature addition polymerization in high conversion are of considerable interest.

This invention has as an object a new polymerization process. Other objects will appear hereinafter.

These objects are accomplished by this invention wherein a monomer subject to addition polymerization by reason of but one non-aromatic carbon to carbon double bond is polymerized by bringing the monomer in contact with an organic diazosulfone. The polymerization can be effected at a relatively high rate even at low temperatures. A preferred embodiment of this invention is the use of an aromatic diazosulfone particularly in the presence of small amounts of a metallic ion and more particularly a cupric salt.

The following examples in which parts are by weight are illustrative of the invention.

Example I

A glass container was charged with 13.2 parts of acrylonitrile, 28 parts absolute ethanol, 0.04 part of cupric chloride dihydrate, 0.31 part of benzenediazophenylsulfone and 75 parts of water. The air was removed from the container by flushing with purified nitrogen and the vessel sealed. After thirty minutes at 30° C., the polymer was removed by filtration. There was obtained 9.9 parts of polyacrylonitrile, corresponding to a 71% conversion, which had a relative viscosity of 1.120 measured on 0.1 g. of polymer in 100 ml. solution of dimethylformamide.

Example II

When the general procedure of Example I was repeated except that no cupric chloride was employed, there was obtained a 22% conversion of acrylonitrile to the polymer in four hours at 25° C.

Example III

A glass container was charged with 13.2 parts of acrylonitrile, 78 parts of cyclohexane and 0.12 part of benzenediazophenylsulfone. There was obtained a 55% conversion of monomer to polymer in four hours at 40° C.

Example IV

A container was charged with 80 parts of ethanol, 100 parts of water, 15.6 parts of vinyl chloride and 0.31 part of benzenediazophenylsulfone. After 20 hours at 40° C., a 10.3% conversion of monomer to polyvinyl chloride was obtained.

Example V

When the general procedure of Example IV was repeated except that 0.05 part of cupric chloride was added, there was obtained a 13.5% conversion to polyvinyl chloride.

Example VI

A vessel was charged with 40 parts of ethanol, 50 parts of water, 12.5 parts of methyl methacrylate and 0.06 part of benzenediazophenylsulfone. After standing at 25° C. for 48 hours, a 47% conversion of monomer to polymer occurred.

Example VII

When the general procedure of Example VI was repeated except that 0.05 part of cupric chloride was also included, there was obtained a 93% yield of polymethyl methacrylate in 24 hours.

In contrast to the results obtained in Examples VI and VII, when the general procedure of these examples was repeated except that ammonium benzenediazosulfonate ($C_6H_5N=NSO_3NH_4$) was employed in the place of the sulfone, no polymerization occurred in the absence of light. Acrylonitrile similarly was not readily polymerized by ammonium benzenediazosulfonate in the absence of light.

Example VIII

A stainless steel pressure-resistant vessel capable of holding 400 parts of water was flushed with nitrogen and charged with 80 parts of benzene and 0.1 part of p-chlorophnyldiazo-p-chlorophenylsulfone. The nitrogen was removed by evacuation and the reactor charged with ethylene. The reaction and contents were heated to a temperature of 100° C. for ten hours with the ethylene pressure maintained at 900 atmospheres. The ethylene polymer obtained had a tensile strength of 2808 lbs. per sq. in. at 23% elongation.

Example IX

A glass container was charged with 21.2 parts of acrylonitrile, 78 parts of cyclohexane and 0.25 part of p-chlorophenyldiazo-p-chlorophenylsulfone. After heating for 3.5 hours at 60° C. there was obtained seven parts of polyacrylonitrile which had a relative viscosity of 1.084 measured as in Example I.

The sulfone employed in Examples I to VII was prepared by the method of Koenigs, Ber. 10, 1532 (1877). The sulfone of Examples VIII and IX was prepared by the general procedure of Meerwein, J. Pr. Chem. 152, 251 (1939). Related sulfones may be prepared by the method of Dutt, Whitehead and Wormall, J. Chem. Soc. 119, 2089-2094 (1921).

The process of this invention is of generic application to the addition polymerization of polymerizable compounds having but one non-aromatic, or ethylenic, $>C=<$ group. It is applicable to monomeric unsaturated polymerizable compounds in which the unsaturation is due to a terminal ethylenic group which is attached to a negative radical. It is thus applicable to polymerizable vinylidene compounds, including vinyl compounds and particularly preferred are those which contain the $CH_2=C<$ group.

Compounds having a terminal methylene which are subject to polymerization and copolymerization include olefins, e. g., ethylene, isobutylene; acrylyl and alkacrylyl compounds, e. g., acrylonitrile, methyl acrylate, ethyl methacrylate, methacrylic acid, methacrylamide; vinyl and vinylidene halides, e. g., vinyl fluoride, vinylidene chloride; vinyl carboxylates, e. g., vinyl acetate, vinyl trimethylacetate; vinyl imides, e. g., N-vinylphthalimide; N-vinylactams, e. g., N-vinylcaprolactam, vinyl aryls such as styrene and other vinyl derivatives such as vinylpyridine, methyl vinyl ketone and vinyl ethyl ether.

Polyfluoroethylenes, including tetrafluoroethylene, chlorotrifluoroethylene and 1,1-dichloro-2,2-difluoroethylene may be polymerized and copolymerized by the process of this invention.

In addition to copolymers obtainable from the classes of monomers mentioned above, the copolymerization of fumeric or maleic esters with types of monomers mentioned, may be effected by the process of this invention. Furthermore, the term "polymerization" is meant to include within its scope, in addition to the polymerization of a monomer alone or of two or more monomers, i. e., copolymerization, the polymerization of unsaturated monomer in the presence of a chain transfer agent, e. g., carbon tetrachloride. The latter has been called "telomerization."

This invention is applicable to the polymerization of any monoethylenically unsaturated compound subject to addition polymerization by prior techniques. Optimum conditions may vary from monomer to monomer and since liquid phase polymerization is desired, gases such as ethylene and propylene require pressure.

The polymerizations are usually carried out at —20° C. to 100° C. Optimum results are obtained in aqueous systems at 0-40° C. Temperatures may be lower although the rate of polymerization is generally low. Higher temperatures may be used particularly when the time of polymerization is to be kept at a minimum, e. g., in a continuous process. In general the time required for substantial polymerization depends upon other variables such as the specific temperature and concentrations of monomer, catalyst, etc. Times of from 1 to 24 hours are customarily employed.

The polymerization may be carried out by conventional means. Liquid media in which the catalyst, monomer, and diluent are uniformly distributed, i. e., as a solution or emulsion, are preferred. In general aqueous systems are preferred when small amounts of a cupric salt are added as an activator.

Although both aromatic and aliphatic diazosulfones may be employed as catalysts in the process of this invention, in view of availability and ease of preparation, the aromatic diazosulfones are preferred and of these, those in which the aromatic group is mononuclear are preferred. Further examples of such aromatic diazosulfones are phenyldiazo-p-tolylsulfones, o-tolyldiazo-p-tolylsulfone, p-tolyldiazo-p-tolylsulfone, p-chlorophenyldiazo-p-tolylsulfone, o-tolyldiazophenylsulfone, m-tolyldiazophenylsulfone, p-tolyldiazophenylsulfone, p-chlorophenyldiazophenylsulfone, etc. These and other diazosulfones may be made by the process of Meerwein et al., (J. prakt. Chem. 152, 251 (1939). The amount of diazosulfone present as the catalyst may vary within wide limits. In general amounts of 0.01 to 5% based on the weight of polymerizable monomer are generally used.

When metallic ions are present, the rate of polymerization may be increased, particularly in aqueous systems. The metallic activator is generally present in very small amounts, e. g., from 0.001 to 10% based on the diazosulfone. Suitable activator compounds are cupric salts, e. g., such as cupric sulfate or cupric chloride.

Polymerizations may be carried out by the process of this invention at low temperatures in either polar or non-polar solvents. The diazosulfones are stable compounds which do not tend to oxidize other compounds. They are soluble in hydrocarbons and may be employed in bulk polymerizations or in solution such as in cyclohexane.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the polymerization of a polymerizable monomer composition the polymerizable components of which have but one non-aromatic ethylenic carbon carbon double bond and subject to addition polymerization which comprises bringing the monomer in contact with an organic diazosulfone having the azo group directly attached to the sulfone group.

2. A process for the polymerization of a polymerizable monomer composition the polymerizable components of which have but one non-aromatic ethylenic carbon carbon double bond and subject to addition polymerization which comprises bringing the monomer in contact with an aromatic diazosulfone having the azo group directly attached to the sulfone group.

3. A process for the polymerization of a polymerizable monomer composition the polymerizable components of which have but one non-aromatic ethylenic carbon carbon double bond and subject to addition polymerization which comprises bringing the monomer in contact with a mononuclear aromatic diazosulfone having two mononuclear aromatic radicals joined by an —N$_2$SO$_2$— group.

4. A process for the polymerization of a polymerizable monomer composition the polymerizable components of which have but one non-aromatic ethylenic carbon carbon double bond and subject to addition polymerization which comprises bringing the monomer in contact with p-chlorophenyldiazo-p-chlorophenylsulfone

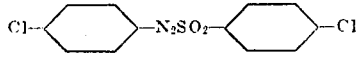

5. A process for the polymerization of a polymerizable composition the polymerizable components of which have but one non-aromatic ethylenic bond including a CH$_2$=C< monomer subject to addition polymerization which comprises bringing said composition in contact with an organic diazosulfone having the azo group directly attached to the sulfone group.

6. A process for the polymerization of a polymerizable composition the polymerizable components of which have but one non-aromatic ethylenic bond including a CH$_2$=C< monomer subject to addition polymerization which comprises bringing said composition in contact with an aromatic diazosulfone having the azo group directly attached to the sulfone group.

7. A process for the polymerization of a polymerizable composition the polymerizable components of which have but one non-aromatic ethylenic bond including a CH$_2$=C< monomer subject to addition polymerization which comprises bringing said composition in contact with a mononuclear aromatic diazosulfone having two mononuclear aromatic radicals joined by an —N$_2$SO$_2$— group.

8. A process for the polymerization of a polymerizable composition the polymerizable components of which have but one non-aromatic ethylenic bond including a CH$_2$=C< monomer subject to addition polymerization which comprises bringing said composition in contact with p-chlorophenyldiazo-p-chlorophenylsulfone

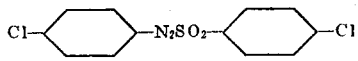

9. Process of claim 8 wherein the monomer is ethylene.

10. Process of claim 8 wherein the monomer is acrylonitrile.

CLEMENT W. THEOBALD.

REFERENCES CITED

The following references are of record in the file of this patent:

UNITED STATES PATENTS

| Number | Name | Date |
|---|---|---|
| 2,376,963 | Garvey | May 29, 1945 |
| 2,501,692 | Reynolds et al. | Mar. 28, 1950 |
| 2,527,393 | Brown | Oct. 24, 1950 |

OTHER REFERENCES

Koenigs: Ber. 10, 1531 (1877).